US012764529B2

(12) United States Patent
Ouellette et al.

(10) Patent No.: US 12,764,529 B2
(45) Date of Patent: Oct. 13, 2026

(54) SPLIT COMMUNICATIONS FOR UPDATING REMOTE FIELD DEVICES

(71) Applicant: Tyco Fire & Security GmbH, Neuhausen am Rheinfall (CH)

(72) Inventors: Jason M. Ouellette, Leominster, MA (US); Matthew H. Paul, Palatine, IL (US)

(73) Assignee: Tyco Fire & Security GmbH, Neuhausen am Rheinfall (CH)

(*) Notice: Subject to any disclaimer, the term of this patent is extended or adjusted under 35 U.S.C. 154(b) by 304 days.

(21) Appl. No.: 18/435,526

(22) Filed: Feb. 7, 2024

(65) Prior Publication Data

US 2025/0254518 A1 Aug. 7, 2025

(51) Int. Cl.
*H04W 12/06* (2021.01)
*H04L 9/40* (2022.01)

(52) U.S. Cl.
CPC ............. *H04W 12/06* (2013.01); *H04L 63/08* (2013.01)

(58) Field of Classification Search
CPC ......... H04W 4/80; H04W 4/029; H04W 4/02; H04W 12/06; H04W 12/08; H04W 8/005; H04W 4/33; H04W 64/00; H04W 4/50; H04W 12/63; H04W 4/70; H04W 4/025; H04W 76/10; H04W 4/38; H04W 48/10; H04W 48/18; H04W 12/00; H04W 92/18; H04W 76/19; H04W 40/20
See application file for complete search history.

(56) References Cited

U.S. PATENT DOCUMENTS

| | | | |
|---|---|---|---|
| 7,895,663 | B1 | 2/2011 | Rao et al. |
| 8,214,653 | B1 | 7/2012 | Marr et al. |
| 8,898,748 | B2 | 11/2014 | Burks et al. |
| 9,463,954 | B2 | 10/2016 | Kumar et al. |

(Continued)

FOREIGN PATENT DOCUMENTS

| | | | |
|---|---|---|---|
| AU | 2012338881 | A1 | 5/2014 |
| DE | 10 2022 103950 | A1 | 8/2023 |

(Continued)

OTHER PUBLICATIONS

US 10,620,940 B1, 04/2020, Koeppel (withdrawn)

(Continued)

*Primary Examiner* — Kwasi Karikari
(74) *Attorney, Agent, or Firm* — ArentFox Schiff LLP

(57) ABSTRACT

Disclosed herein are apparatuses and methods for performing manufacturer control functions on a remote field device. In one example, a mobile device can transmit, to a remote field device, a connection request including credentials related to performing a manufacturer control function the remote field device. The remote field device can verify the credentials with stored manufacturer credentials that are stored in the one or more memories for performing the manufacturer control function, where the stored manufacturer credentials are different from stored owner credentials stored in the one or more memories for accessing other functions of the remote field device. Based on verifying the credentials, a connection between the remote field device and the mobile device can be established to allow initiating, by the mobile device, the manufacturer control function on the remote field device.

20 Claims, 4 Drawing Sheets

(56) References Cited

U.S. PATENT DOCUMENTS

| | | | | |
|---|---|---|---|---|
| 9,565,207 | B1 | 2/2017 | Marr et al. | |
| 10,013,826 | B2 | 7/2018 | Ouellette | |
| 10,135,617 | B2 | 11/2018 | Bizzarri | |
| 10,162,622 | B2 | 12/2018 | Gandhi et al. | |
| 10,366,388 | B2 | 7/2019 | Campero et al. | |
| 10,440,181 | B1 | 10/2019 | Brown et al. | |
| 10,520,210 | B2 | 12/2019 | Park et al. | |
| 10,671,375 | B1 | 6/2020 | Koeppel | |
| 10,771,450 | B2 | 9/2020 | Willis et al. | |
| 10,788,229 | B2 | 9/2020 | Sinha et al. | |
| 11,075,906 | B2 | 7/2021 | Neilan | |
| 11,127,235 | B2 | 9/2021 | Sinha et al. | |
| 11,212,389 | B2 | 12/2021 | Brown et al. | |
| 11,334,655 | B2 | 5/2022 | Duval | |
| 11,375,363 | B2 | 6/2022 | Magadevan et al. | |
| 11,398,896 | B2 | 7/2022 | Sharma et al. | |
| 11,469,893 | B2 | 10/2022 | Herrero et al. | |
| 11,582,027 | B1 | 2/2023 | Lawton | |
| 12,520,149 | B2 * | 1/2026 | Holt | H04W 12/084 |
| 2016/0036814 | A1 * | 2/2016 | Conrad | H04L 9/0891 713/171 |
| 2017/0069149 | A1 * | 3/2017 | Scheja | G07C 9/27 |
| 2017/0103239 | A1 * | 4/2017 | DeYoung | G06Q 10/08 |
| 2017/0195336 | A1 | 7/2017 | Ouellette | |
| 2017/0277920 | A1 * | 9/2017 | DeYoung | G06Q 10/08 |
| 2018/0248704 | A1 * | 8/2018 | Coode | H04L 9/0825 |
| 2018/0288617 | A1 | 10/2018 | Robinson | |
| 2020/0244664 | A1 | 7/2020 | Pate et al. | |
| 2020/0382499 | A1 | 12/2020 | Sosiade et al. | |
| 2020/0409689 | A1 | 12/2020 | Rouland et al. | |
| 2021/0327189 | A1 | 10/2021 | Jarvis et al. | |
| 2022/0019422 | A1 | 1/2022 | Anderson | |
| 2022/0414602 | A1 | 12/2022 | Ouellette | |
| 2023/0011396 | A1 | 1/2023 | Ouellette et al. | |
| 2025/0254518 | A1 | 8/2025 | Ouellette et al. | |

FOREIGN PATENT DOCUMENTS

| | | | |
|---|---|---|---|
| EP | 3291087 | A1 | 3/2018 |
| EP | 4050579 | A1 | 8/2022 |
| WO | 2018/157247 | A1 | 9/2018 |
| WO | 2019/108436 | A1 | 6/2019 |
| WO | 2021/067192 | A1 | 4/2021 |
| WO | 2021/229351 | A1 | 11/2021 |
| WO | 2022/266835 | A1 | 12/2022 |

OTHER PUBLICATIONS

Kolehmainen Antti, “Secure Firmware Updates for IoT: A Survey”, 2018 IEEE International Conference On Internet of Things (Ithings) and IEEE Green Computing and Communications (Greencom) and IEEE Cyber, Physical and Social Computing (CPSCOM) and IEEE Smart Data (Smartdata), IEEE, Jul. 30, 2018 (Jul. 30, 2018), pp. 112-117, XP033556196, DOI: 10.1109/CYBERMATICS_2018.2018.00051 [retrieved on May 30, 2019] * the whole document *.

European Search Report issued in corresponding European Application No. EP25156215 dated Jun. 20, 2025.

* cited by examiner

SPLIT COMMUNICATIONS FOR UPDATING REMOTE FIELD DEVICES

TECHNICAL FIELD

The described aspects relate to using mobile applications to configure or communicate with remote field devices.

BACKGROUND

Aspects of the present disclosure relate generally to remote field devices deployed for providing building management related functions, and more particularly, to using mobile applications to configure or communicate with remote field devices.

Remote field devices are provided for deploying within buildings or other areas to manage certain functions related to the building or other areas. The remote field devices can include a variety of devices that allow for building management, such as sensor devices (e.g., incident detection devices, biometric sensors, etc.), access control devices (e.g., door or window locks, access control card or device readers, etc.), and/or the like. A remote field device can include substantially any device that may be remotely deployed at a building or other area and may not have an active connection to a network or device to facilitate configuration or update of the remote field device.

The remote field devices may be subscription-based devices where a manufacturer of the remote field device can enable an owner of the remote field device to, based on a subscription for the remote field device, define access credentials for accessing the remote field device for configuring or updating the remote field device (e.g., via an application executing on a mobile device owned by the owner of the remote field device). In this regard, the owner of the remote field device can configure the remote field device to be accessible only by the application executing on the mobile device owned by the owner of the remote field device, which can include initially setting up the remote field device using the application, the application configuring and/or storing credentials to access the remote field device, etc. This can prevent other users from tampering with the remote field devices.

Such remote field devices can present a challenge for keeping the devices up to date for firmware, security updates and configuration, updates based on rules, etc., especially for multi-tenant facilities where access to the site is limited and can be long periods of time between visits. As a result, the remote field devices can become stagnant and out-of-date, which may pose security and/or functional problems with the remote field devices.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

One example of an aspect includes a remote field device having one or more memories configured to, individually or in combination, store instructions, and one or more processors communicatively coupled with the one or more memories. The one or more processors are, individually or in combination, configured to execute the instructions to cause the remote field device to receive, from a mobile device, a connection request including credentials related to performing a manufacturer control function the remote field device, verify the credentials with stored manufacturer credentials that are stored in the one or more memories for performing the manufacturer control function, where the stored manufacturer credentials are different from stored owner credentials stored in the one or more memories for accessing other functions of the remote field device, and based on verifying the credentials, establish a connection with the mobile device to allow initiating, by the mobile device, the manufacturer control function on the remote field device.

Another example of an aspect includes a mobile device having one or more memories configured to, individually or in combination, store instructions, and one or more processors communicatively coupled with the one or more memories. The one or more processors are, individually or in combination, configured to execute the instructions to cause the mobile device to detect a signal broadcasted by a remote field device, where the signal includes a unique identifier of the remote field device, transmit, to the remote field device and based on the unique identifier, a connection request including credentials related to performing a manufacturer control function on the remote field device, and based on a response to the connection request from the remote field device, establish a connection with the remote field device to allow initiating, by the mobile device, the manufacturer control function on the remote field device.

Another example of an aspect includes a method for performing manufacturer control functions on a remote field device including receiving, from a mobile device, a connection request including credentials related to performing a manufacturer control function the remote field device, verifying the credentials with stored manufacturer credentials that are stored in the one or more memories for performing the manufacturer control function, where the stored manufacturer credentials are different from stored owner credentials stored in the one or more memories for accessing other functions of the remote field device, and based on verifying the credentials, establishing a connection with the mobile device to allow initiating, by the mobile device, the manufacturer control function on the remote field device.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
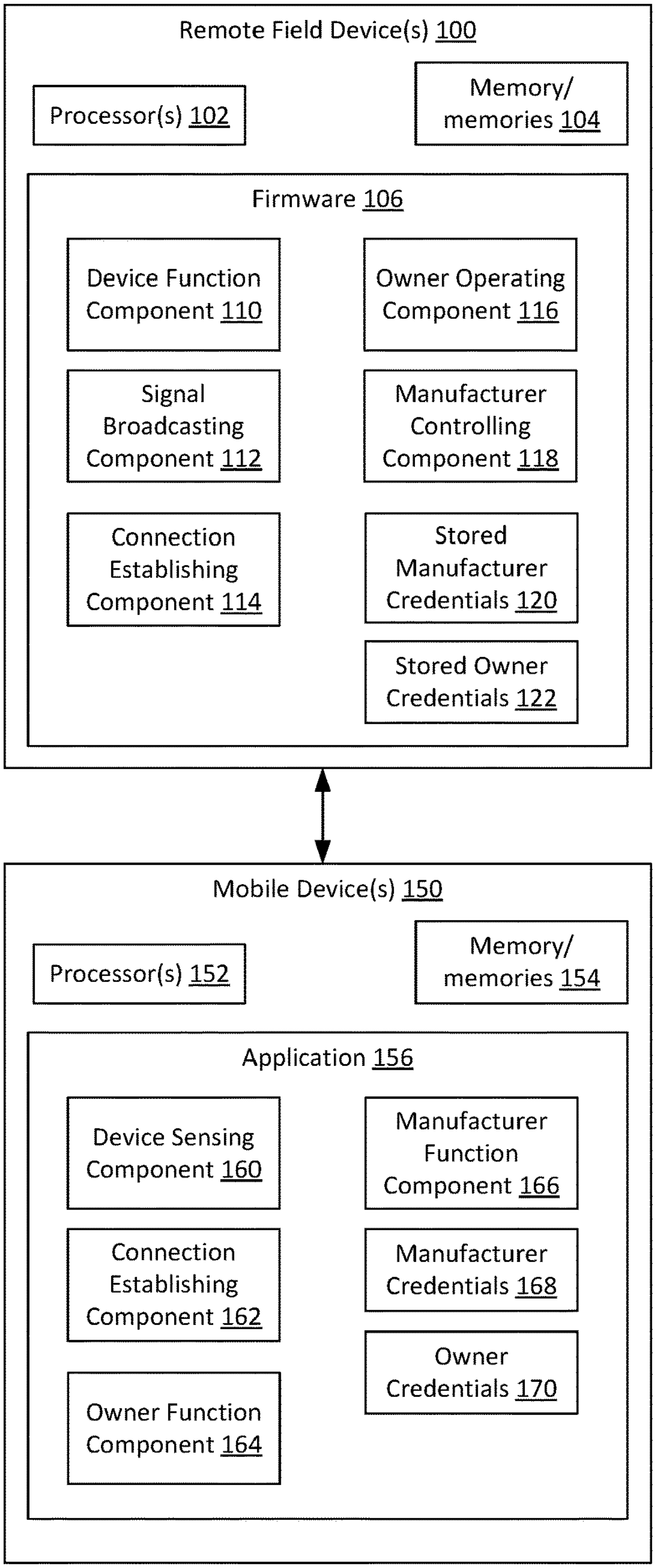
FIG. 1 is a block diagram of an example of a remote field device and a mobile device that can communicate with one another to allow the mobile device to configure the remote field device for operation, in accordance with aspects described herein.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Aspects described herein relate to enabling split communications in a remote field device to provide a separate channel or subnetwork for updating the remote field device. For example, the remote field device can operate a first channel or subnetwork (e.g., a main channel or subnetwork) to allow normal use or configuration functions to an owner of the remote field device. In addition, for example, the remote field device can also operate a second channel or subnetwork (e.g., an manufacturer control channel or subnetwork) to allow a device of a different user or non-owner limited functionality with the remote field device, such as to only update the firmware of the remote field device, via an application operated by the manufacturer of the remote field device. In one example, the remote field device can store separate credential information to facilitate establishing a connection with a mobile device or associated application for either normal use or manufacturer control use. The application executing on the mobile device can detect presence of the remote field device, and can accordingly request connection thereto providing credentials related to normal use or manufacturer control use. For example, the remote field device can verify the credentials and accordingly establish a connection with the mobile device or associated application for the corresponding purpose.

Using the additional channel or subnetwork for manufacturer control operation in this regard can allow for other mobile devices or application that are not owned by the owner to update the firmware or perform other management functions for the remote field device. In addition, for example, the mobile devices or application can initiate the manufacturer controlled functions when it detects presence of the remote user device and without necessarily requiring user interaction with the mobile device or application. In an example, the manufacturer control connection is associated with its own set of credentials to allow for securing and firewalling the connection for normal use or configuration to prevent mobile devices or applications not owned by the owner from performing any functions other than updating the remote field device. Moreover, in an example, a manufacturer of the remote field device can define the manufacturer control credentials and/or the application functionality to perform the updating to further prevent non-owner users from tampering with the remote field device via the mobile device or application. Thus, for example, updates can be managed via any mobile application provided by the manufacturer, regardless of tenant relationship to the devices from the manufacturer's portal, for functions such as, but not limited to firmware, security updates, configuration changes, policies, feature changes, etc.

As used herein, a processor, at least one processor, and/or one or more processors, individually or in combination, configured to perform or operable for performing a plurality of actions is meant to include at least two different processors able to perform different, overlapping or non-overlapping subsets of the plurality actions, or a single processor able to perform all of the plurality of actions. In one non-limiting example of multiple processors being able to perform different ones of the plurality of actions in combination, a description of a processor, at least one processor, and/or one or more processors configured or operable to perform actions X, Y, and Z may include at least a first processor configured or operable to perform a first subset of X, Y, and Z (e.g., to perform X) and at least a second processor configured or operable to perform a second subset of X, Y, and Z (e.g., to perform Y and Z). Alternatively, a first processor, a second processor, and a third processor may be respectively configured or operable to perform a respective one of actions X, Y, and Z. It should be understood that any combination of one or more processors each may be configured or operable to perform any one or any combination of a plurality of actions.

As used herein, a memory, at least one memory, and/or one or more memories, individually or in combination, configured to store or having stored thereon instructions executable by one or more processors for performing a plurality of actions is meant to include at least two different memories able to store different, overlapping or non-overlapping subsets of the instructions for performing different, overlapping or non-overlapping subsets of the plurality actions, or a single memory able to store the instructions for performing all of the plurality of actions. In one non-limiting example of one or more memories, individually or in combination, being able to store different subsets of the instructions for performing different ones of the plurality of actions, a description of a memory, at least one memory, and/or one or more memories configured or operable to store or having stored thereon instructions for performing actions X, Y, and Z may include at least a first memory configured or operable to store or having stored thereon a first subset of instructions for performing a first subset of X, Y, and Z (e.g., instructions to perform X) and at least a second memory configured or operable to store or having stored thereon a second subset of instructions for performing a second subset of X, Y, and Z (e.g., instructions to perform Y and Z). Alternatively, a first memory, and second memory, and a third memory may be respectively configured to store or have stored thereon a respective one of a first subset of instructions for performing X, a second subset of instruction for performing Y, and a third subset of instructions for performing Z. It should be understood that any combination of one or more memories each may be configured or operable to store or have stored thereon any one or any combination of instructions executable by one or more processors to perform any one or any combination of a plurality of actions. Moreover, one or more processors may each be coupled to at least one of the one or more memories and configured or operable to execute the instructions to perform the plurality of actions. For instance, in the above non-limiting example of the different subset of instructions for performing actions X, Y, and Z, a first processor may be coupled to a first memory storing instructions for performing action X, and at least a second processor may be coupled to at least a second memory storing instructions for performing actions Y and Z, and the first processor and the second processor may, in combination, execute the respective subset of instructions to accomplish performing actions X, Y, and Z. Alternatively, three processors may access one of three different memories each storing one of instructions for performing X, Y, or Z, and the three processor may in combination execute the respective subset of instruction to accomplish performing actions X, Y, and Z. Alternatively, a single processor may execute the instructions stored on a single memory, or distributed across multiple memories, to accomplish performing actions X, Y, and Z.

FIG. 1 is a block diagram of an example of a remote field device 100 and a mobile device 150 that can communicate with one another to allow the mobile device 150 to configure the remote field device 100 for operation, in accordance with aspects described herein. As described, the remote field device 100 can be deployed in a building or other area to provide a building management function. For example, the remote field device 100 can include a sensor device, such as an occupancy sensor, incident detection device (e.g., fire or carbon monoxide detector, gun shot sound detector, natural disaster detector, etc.), biometric sensor, and/or the like, an access control device, such as a door lock, window lock, gate lock, turnstile, access control card or device reader, and/or the like, a safety protection device, such as a fire extinguisher, fire alarm triggering device, security event alarm triggering device, and/or the like, etc. The remote field device 100 can include substantially any device that can be remotely deployed in a building or area without an active network connection that can provide some building management function.

Remote field device 100 can include one or more processor(s) 102 and/or a memory/memories 104 configured to execute or store instructions or other parameters related to performing one or more processes, executing firmware 106, etc. For example, processor(s) 102 and memory/memories 104 may be separate components communicatively coupled by a bus (e.g., on a motherboard or other portion of a computing device, on an integrated circuit, such as a system on a chip (SoC), etc.), components integrated within one another (e.g., processor(s) 102 can include the memory/memories 104 as an on-board component), and/or the like. Memory/memories 104 may store instructions, parameters, data structures, etc. for use/execution by processor(s) 102 to perform functions described herein, including executing firmware 106.

In an example, firmware 106 can include a device function component 110 for executing a function for operating the remote field device 100. For example, the device function component 110 can correspond to operating the remote field device 100 for its intended purposes. For example, where remote field device 100 is a door lock, device function component 110 can operate a locking mechanism (e.g., a deadbolt or other physical locking mechanism) based on logic implemented in the device function component 110 or otherwise in firmware 106. In an example, firmware 106 may also include one or more components related to configuring or communicating with the remote field device 100 or firmware 106. In one example, firmware 106 can include a signal broadcasting component 112 for broadcasting a signal that advertises presence of, or ability to establish connection with, the remote field device 100, a connection establishing component 114 for establishing a connection between the remote field device 100 and another device or application, an owner operating component 116 for facilitating one or more owner-related functions to be performed on the remote field device 100, and/or a manufacturer controlling component 118 for facilitating one or more manufacturer control functions to be performed on the remote field device 100. In this regard, the remote field device 100 can provide split communications to separately allow owner operations and manufacturer control functions. Additionally, in this example, firmware 106 can also store, e.g., in memory/memories 104, stored manufacturer credentials 120 to verify for performing manufacturer control functions, and/or stored owner credentials 122 to verify for performing owner operations on the remote field device 100.

Mobile device 150 can include one or more processor(s) 152 and/or a memory/memories 154 configured to execute or store instructions or other parameters related to performing one or more processes, executing application 156, etc. For example, processor(s) 152 and memory/memories 154 may be separate components communicatively coupled by a bus (e.g., on a motherboard or other portion of a computing device, on an integrated circuit, such as a system on a chip (SoC), etc.), components integrated within one another (e.g., processor(s) 152 can include the memory/memories 154 as an on-board component), and/or the like. Memory/memories 154 may store instructions, parameters, data structures, etc. for use/execution by processor(s) 102 to perform functions described herein, including executing application 156, executing an operating system for the application 156, etc.

In an example, application 156 can include a device sensing component 160 for sensing presence of a remote field device 100, which can be based on a signal broadcasted by the remote field device 100, a connection establishing component 162 for establishing a connection between the mobile device 150 (or application 156) and the remote field device 100, an owner function component 164 for performing one or more owner-related functions on the remote field device 100, and/or a manufacturer function component 166 for performing one or more manufacturer control functions on the remote field device 100. Additionally, in this example, application 156 can also store, e.g., in memory/memories 154, manufacturer credentials 168 to provide for performing the one or more manufacturer control functions, and/or owner credentials 170 to provide for performing the one or more owner-related functions on the remote field device 100.

For example, signal broadcasting component 112 can periodically, or based on a detected event, such as detected presence of a nearby mobile device, broadcast a signal to advertise presence of the remote field device 100. In an example, remote field device 100 can employ a wireless communication technology, such as Bluetooth, Bluetooth low energy (BLE), near-field communications (NFC), Wi-Fi, etc. to broadcast the signal, which may include a unique identifier associated with the remote field device 100. Device sensing component 160 of a mobile device 150 can detect the broadcast signal and/or the unique identifier, and connection establishing component 162 can determine whether the application 156 can establish a connection with the remote field device 100. In an example, connection establishing component 162 can determine whether application 156 can establish one or more of a owner connection or a manufacturer connection with the remote field device 100 based on the unique identifier. In another example, connection establishing component 162 can attempt to establish a connection with the remote field device 100 using the owner credentials 170 first, and if that does not succeed, using the manufacturer credentials 168. In an example, based on the type of connection established and/or credentials used, application 156 can determine whether to support owner functions or manufacturer control functions in communicating with the remote field device 100.

In this regard, for example, firmware 106 can maintain split communications for owner operations and manufacturer controls, as described above and further herein. In particular, for example, each of the communications for owner operations and communications for manufacturer controls can be associated with different channels and/or subnetworks that are each encrypted and firewalled from one another and from other communications, such that a mobile device 150 or associated application 156 cannot use one communication channel/subnetwork to send communications on or for the other communication channel/subnetwork. Accordingly, the owner of the remote field device 100 can maintain ownership and full control over the remote field device 100, while other devices that execute the manufacturer's application can be allowed to update firmware or perform other manufacturer functions on the remote field device 100.

In one example, application 156 of the owner can be used to initially configure or setup the remote field device 100 for deploying the remote field device 100 in the building or other area for functioning as intended by the owner. In one example, application 156 can provide the stored owner credentials 122 to the remote field device 100 during the initial configuration, and remote field device 100 can store the stored owner credentials 122 (e.g., in memory/memories 104) for subsequent use in authenticating/authorizing the application 156 to update configuration or perform other owner operations. In another example, stored manufacturer credentials 120 can be stored in the remote field device(s) 100 (e.g., in memory/memories 104) during manufacturing of the remote field device 100, as a separate process during initial configuration and/or the like. In an example, the stored manufacturer credentials 120 may only be set or updated by the manufacturer (e.g., by using a manufacturer function via application 156).

Figure 2:
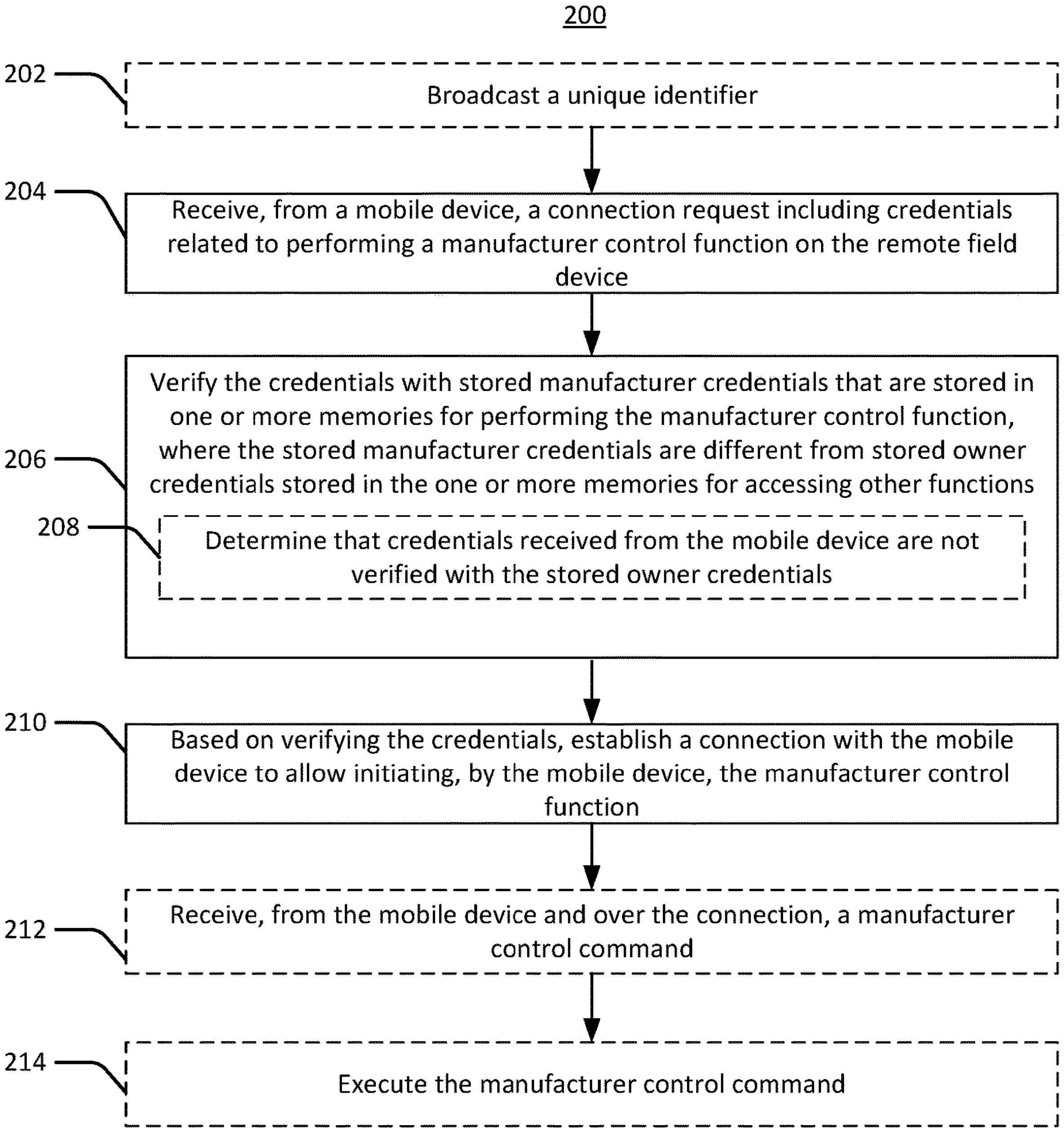
FIG. 2 illustrates a flowchart of an example of a method for enabling a mobile device to perform manufacturer control functions on a remote field device, in accordance with aspects described herein.
Figure 3:
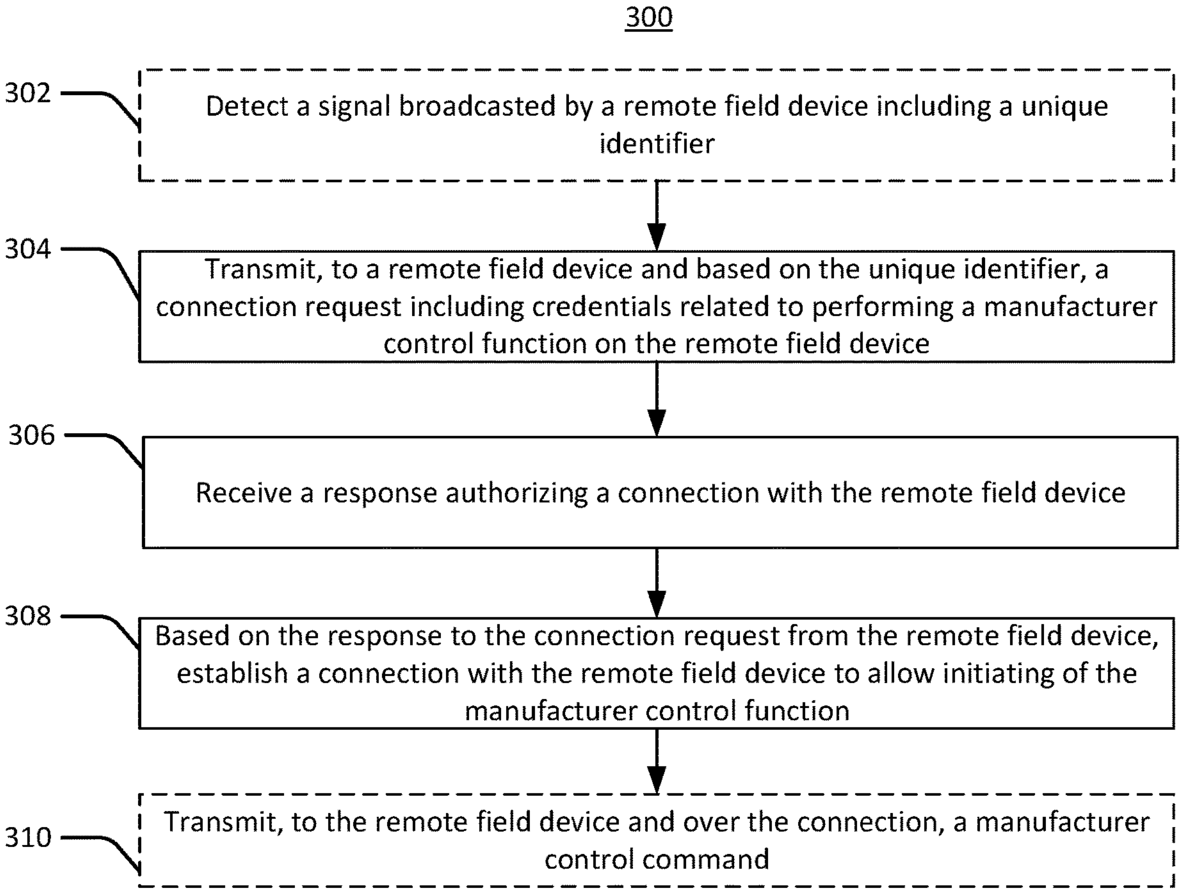
FIG. 3 illustrates a flowchart of an example of a method for performing, on a remote field device by a mobile device, manufacturer control functions, in accordance with aspects described herein.

FIG. 2 illustrates a flowchart of an example of a method 200 for enabling a mobile device to perform manufacturer control functions on a remote field device, in accordance with aspects described herein. FIG. 3 illustrates a flowchart of an example of a method 300 for performing, on a remote field device by a mobile device, manufacturer control functions, in accordance with aspects described herein. For example, method 300 can be performed by a mobile device 150 and/or one or more systems or components thereof to facilitate performing manufacturer control functions on remote field devices. In the following examples, methods 200 and 300 are described in conjunction with one another for ease of explanation, but the methods 200 and 300 do not require each other to provide the associated functions, and indeed different devices can operate one of methods 200 and 300 without requiring the other one of methods 200 and 300.

At block 202, method 200 can optionally include broadcasting a unique identifier. In an aspect, signal broadcasting component 112, e.g., in conjunction with remote field device 100, processor(s) 102, memory/memories 104, firmware 106, etc., can broadcast a unique identifier of the remote field device 100. For example, signal broadcasting component 112 can broadcast the unique identifier in accordance with a wireless communication technology supported by the remote field device 100, such as Bluetooth, BLE, NFC, etc., as described above. In an example, the unique identifier can be a globally unique identifier for the remote field device 100 and may include one or more portions that identify the manufacturer of the remote field device 100, or from which the manufacturer of the remote field device 100 can be determined.

At block 302, method 300 can optionally include detecting a signal broadcasted by a remote field device including a unique identifier. In an aspect, device sensing component 160, e.g., in conjunction with mobile device 150, processor (s) 152, memory/memories 154, application 156, etc., can detect the signal broadcasted by the remote field device (e.g., remote field device 100) including the unique identifier. For example, mobile device 150 can include a signal receiver that is configured to detect signals of one or more wireless communication technologies, such as Bluetooth, BLE, NFC, etc., which may be supported and used by the remote field device 100 to broadcast an identification signal, as described above. Device sensing component 160 can receive the signal and/or can determine, based on the unique identifier, that the remote field device 100 is manufactured by a manufacturer associated with the application 156, or that the application 156 is otherwise operable to communicate with the remote field device 100, at least for performing manufacturing functions.

At block 304, method 300 can include transmitting, to the remote field device and based on the unique identifier, a connection request including credentials related to performing a manufacturer control function on the remote field device. In an aspect, connection establishing component 162, e.g., in conjunction with mobile device 150, processor (s) 152, memory/memories 154, application 156, etc., can transmit, to the remote field device (e.g., remote field device 100) and based on the unique identifier, the connection request including credentials related to performing the manufacturer control function on the remote field device. For example, connection establishing component 162 can obtain the manufacturer credentials 168, which can be different from owner credentials 170 for the remote field device 100 and/or can be configured to the remote field device 100 by the manufacturer and separate from the owner credentials, as described above and further herein. In an example, connection establishing component 162 can obtain the manufacturer credentials 168 based on determining that the application 156 can request the connection for performing manufacturer control functions based on the unique identifier. In one example, this can also be based on connection establishing component 162 determining that the application cannot request the connection for performing owner operations on the remote field device 100. In other words, in some examples, the application 156 can prefer to establish the connection with the remote field device 100 for performing owner operations over manufacturer control functions where permitted. In yet another example, connection establishing component 162 can attempt to establish a connection with the remote field device 100 for owner operations first, by providing the owner credentials 170, and if that fails, can then attempt to establish a connection with the remote field device 100 for manufacturer control functions by providing the manufacturer credentials 168.

At block 204, method 200 can include receiving, from a mobile device, a connection request including credentials related to performing a manufacturer control function on the remote field device. In an aspect, connection establishing component 114, e.g., in conjunction with remote field device 100, processor(s) 102, memory/memories 104, firmware 106, etc., can receive, from the mobile device (e.g., mobile device 150), the connection request including credentials related to performing the manufacturer control function on the remote field device 100. For example, the credentials can correspond to establishing a secure channel or subnetwork with the remote field device 100 for performing the manufacturer control function. The secure channel or subnetwork can include a public key infrastructure (PKI) based encrypted communication that can be managed by a manufacturer service account owned by the manufacturer and compliant with one or more security-based standards for password management and storage, and can be isolated and firewalled from the owner private communication.

At block 206, method 200 can include verifying the credentials with stored manufacturer credentials that are stored in one or more memories for performing the manufacturer control function, where the stored manufacture credentials are different from stored owner credentials stored in the one or more memories for accessing other functions. In an aspect, connection establishing component 114, e.g., in conjunction with remote field device 100, processor(s) 102, memory/memories 104, firmware 106, etc., can verify the credentials with stored manufacturer credentials (e.g., stored manufacturer credentials 120) that are stored in the one or more memories (e.g., memory/memories 104) for performing the manufacturer control function, where the stored manufacturer credentials are different from stored owner credentials (e.g., stored owner credentials 122) stored in the one or more memories for accessing other functions of the remote field device 100. As described, for example, the stored owner credentials 122 can be used for performing owner operations on the remote field device 100 for configuring the remote field device 100 for operating as intended by the owner, or otherwise communicating with the remote field device 100 (e.g., in accordance with a subscription for the device). In an example, connection establishing component 114 can verify the credentials using PKI mechanisms to compare or perform a security function with the received credentials and the stored manufacturer credentials 120 to detect a match or other compliance.

In one example, verifying the credentials with stored manufacturer credentials 120 at block 206 can be based on, at block 208, determining that credentials received from the mobile device are not verified with the stored owner credentials. In an aspect, connection establishing component 114, e.g., in conjunction with remote field device 100, processor(s) 102, memory/memories 104, firmware 106, etc., can determine that credentials received from the mobile device (e.g., mobile device 150) are not verified with the stored owner credentials (e.g., stored owner credentials 122). In one example, in this regard, connection establishing component 114 may first attempt to verify the received credentials with stored owner credentials 122 to determine whether an owner operation connection can be established, and if not, can then attempt to verify the received credentials with the stored manufacturer credentials 120 to allow manufacturer control functions on the remote field device 100.

At block 210, method 200 can include, based on verifying the credentials, establishing a connection with the mobile device to allow initiating, by the mobile device, the manufacturer control function. In an aspect, connection establishing component 114, e.g., in conjunction with remote field device 100, processor(s) 102, memory/memories 104, firmware 106, etc., can, based on verifying the credentials, establish the connection with the mobile device (e.g., mobile device 150) to allow initiating, by the mobile device, the manufacturer control function. For example, connection establishing component 114 can transmit, to the mobile device, a response to the request for connection indicating that the connection can be established for initiating the manufacturer-control function. As described, for example, the connection can be a Bluetooth, BLE, NFC, Wi-Fi, etc. connection that is established separate from other device owner connections to allow the mobile device 150 or application 156 to perform the manufacturer control function regardless of the owner of the remote field device 100.

At block 306, method 300 can include receiving a response authorizing a connection with the remote field device. In an aspect, connection establishing component 162, e.g., in conjunction with mobile device 150, processor(s) 152, memory/memories 154, application 156, etc., can receive the response (e.g., from remote field device 100) authorizing the connection with the remote field device. As described, for example, connection establishing component 162 can receive the response as a message using Bluetooth, BLE, NFC, Wi-Fi, or other wireless communication technology. In one example, the response may indicate that the mobile device 150 can perform manufacturer control functions on the remote field device 100 (and/or may indicate that the mobile device 150 may not perform owner operations).

At block 308, method 300 can include, based on the response to the connection request from the remote field device, establishing a connection with the remote field device to allow initiating of the manufacturer control function. In an aspect, connection establishing component 162, e.g., in conjunction with mobile device 150, processor(s) 152, memory/memories 154, application 156, etc., can, based on the response to the connection request from the remote field device (e.g., remote field device 100), establish a connection with the remote field device to allow initiating of the manufacturer control function. As described, for example, this can include establishing a secure connection with the remote field device 100, e.g., using Bluetooth, BLE, NFC, Wi-Fi, etc., where the connection can be established separate from other device owner connections to allow the mobile device 150 or application 156 to perform the manufacturer control function regardless of the owner of the remote field device 100.

At block 310, method 300 can optionally include transmitting, to the remote field device and over the connection, a manufacturer control command. In an aspect, manufacturer function component 166, e.g., in conjunction with mobile device 150, processor(s) 152, memory/memories 154, application 156, etc., can transmit, to the remote field device (e.g., remote field device 100) and over the connection, the manufacturer control command. For example, as described, the manufacturer control command can relate to updating firmware, performing security updates, performing certain configuration changes, performing policy updates, providing or enabling features for the remote field device 100, etc. Thus, in one example, transmitting the manufacturer control command can include manufacturer function component 166 transmitting, to the remote field device 100, a firmware update package that the remote field device 100 can execute to update its firmware 106.

At block 212, method 200 can optionally include receiving, from the mobile device and over the connection, a manufacturer control command. In an aspect, manufacturer controlling component 118, e.g., in conjunction with remote field device 100, processor(s) 102, memory/memories 104, firmware 106, etc., can receive, from the mobile device (e.g., mobile device 150) and over the connection, the manufacturer control command. As described, for example, the manufacturer control command can relate to performing one or more manufacturer control functions, such as updating firmware, performing security updates, performing certain configuration changes, performing policy updates, providing or enabling features for the remote field device 100, etc.

At block 214, method 200 can optionally include executing the manufacturer control command. In an aspect, manufacturer controlling component 118, e.g., in conjunction with remote field device 100, processor(s) 102, memory/memories 104, firmware 106, etc., can execute the manufacturer control command. For example, the manufacturer control command may include software, parameters, or other settings, and manufacturer controlling component 118 can execute associated processes or functions to perform the command. For example, where the manufacturer control command includes a firmware update command the firmware package, manufacturer controlling component 118 can execute a firmware update using the firmware package to update the firmware 106 of the remote field device 100.

Figure 4:
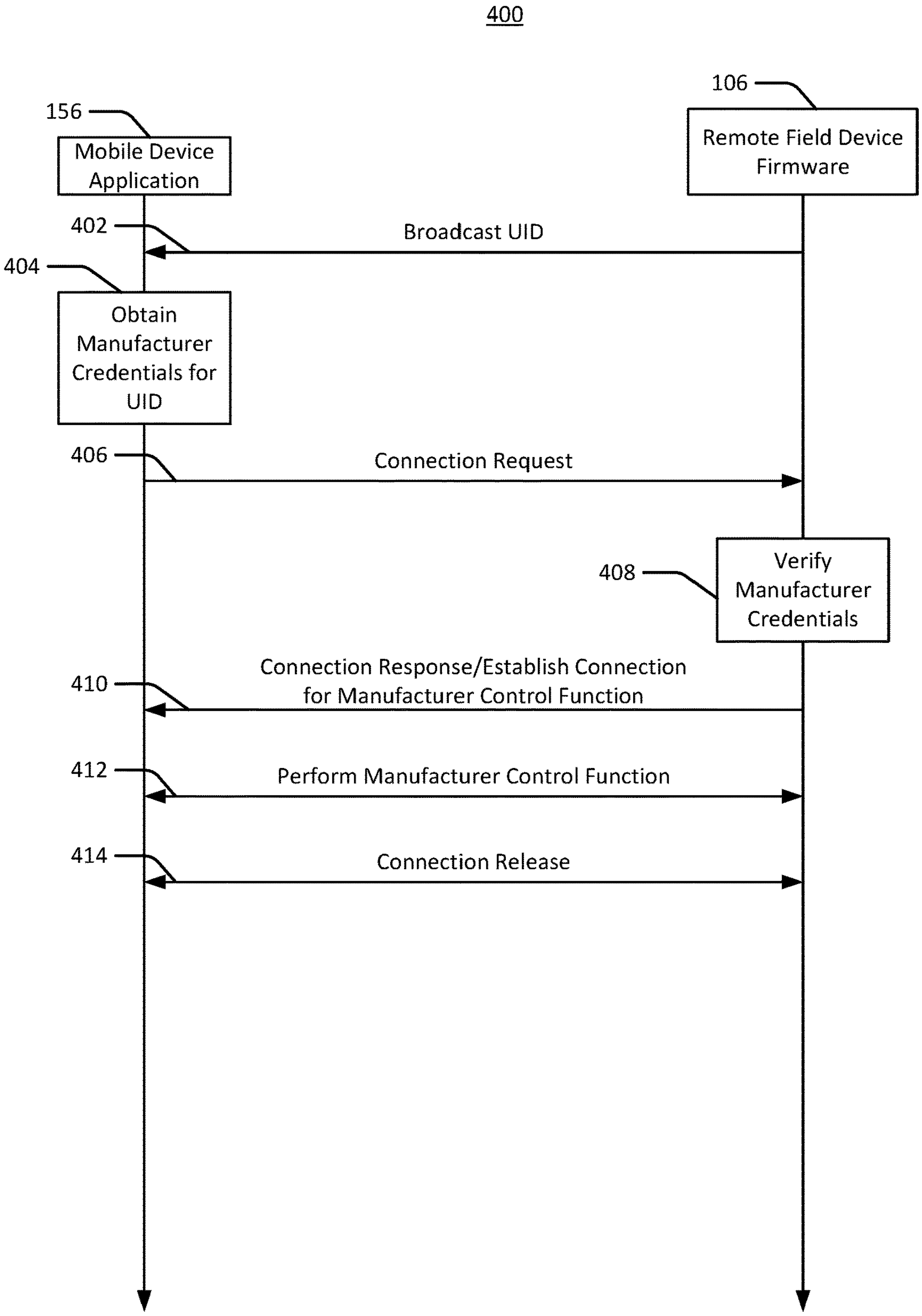
FIG. 4 illustrates an example of a communication flow for performing manufacturer control functions on a remote field device, in accordance with aspects described herein.

FIG. 4 illustrates an example of a communication flow 400 for performing manufacturer control functions on a remote field device, in accordance with aspects described herein. Communication flow 400 can include communications between a mobile device application 156 and a remote field device firmware 106. At 402, the remote field device firmware 106 can broadcast a unique identifier (UID), which can be received by the mobile device application 156 when an associated mobile device comes within proximity of the remote field device to receive the signal having the UID. Based on the UID, the mobile device application 156 can obtain manufacturer credentials for the UID at 404. For example, the mobile device application 156 can store manufacturer credentials for performing manufacturer control functions on remote field devices regardless of an owner of the remote field device, as described herein. At 406, the mobile device application 156 can transmit a connection request to the remote field device firmware 106, which can receive the connection request. At 408, the remote field device firmware 106 can verify the manufacturer credentials received from the mobile device application 156 with credentials stored at the remote field device to verify that the mobile device application 156 is authorized to establish the connection for performing manufacturer control functions on the remote field device.

At 410, based on verifying the manufacturer credentials, the remote field device firmware 106 can transmit, to the mobile device application 156, a connection response and/or establish the connection for manufacturer control functions. In this regard, remote field device firmware 106 can allow the mobile device application 156 to perform manufacturer control functions, at 412, on the remote field device without allowing the mobile device application 156 to perform other owner operations on the remote field device. As described, for example, remote field device firmware 106 can separate the manufacturer control function abilities from the owner operation abilities by providing split communications for each of the entities using associated credentials to setup separate secured connections with the remote field device. At 414, once the manufacturer control function is complete, the mobile device application 156 and/or remote field device firmware 106 can release the connection.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage de-vices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A remote field device, comprising:

one or more memories configured to, individually or in combination, store instructions; and one or more processors communicatively coupled with the one or more memories, wherein the one or more processors are, individually or in combination, configured to execute the instructions to cause the remote field device to:

receive, from a mobile device, a connection request including credentials related to performing a manufacturer control function on the remote field device;

verify the credentials with stored manufacturer credentials that are stored in the one or more memories for performing the manufacturer control function, wherein the stored manufacturer credentials are different from stored owner credentials stored in the one or more memories for accessing other functions of the remote field device; and based on verifying the credentials, establish a connection with the mobile device to allow initiating, by the mobile device, the manufacturer control function on the remote field device, wherein the connection with the mobile device is established via an encrypted secure channel that logically isolated from a second encrypted secure channel that the remote field device establishes with another mobile device authorized for accessing the other functions of the remote field device, such that the connection established via stored manufacturer credentials can access the manufacturer control function and cannot access the other functions.

2. The remote field device of claim 1, wherein the one or more processors are, individually or in combination, configured to execute the instructions to cause the remote field device to broadcast a unique identifier of the remote field device, wherein the one or more processors are, individually or in combination, configured to execute the instructions to cause the remote field device to receive the connection request in response to the broadcasting of the unique identifier.

3. The remote field device of claim 1, wherein the manufacturer control function comprises:

receiving, from the mobile device and over the connection, an updated firmware package; and executing the updated firmware package to update firmware of the remote field device.

4. The remote field device of claim 1, wherein the connection request is received using one of a Bluetooth or near field communication (NFC) technology.

5. The remote field device of claim 1, wherein the one or more processors are, individually or in combination, configured to execute the instructions to cause the remote field device to verify the credentials based on determining that the credentials received from the mobile device are not verified with the stored owner credentials.

6. The remote field device of claim 1, wherein the one or more processors are, individually or in combination, configured to execute the instructions to cause the remote field device to establish the connection with the mobile device as the encrypted secure channel on a subnetwork that is different from the second encrypted secure channel on a second subnetwork that the remote field device establishes with the another mobile device.

7. The remote field device of claim 1, wherein the credentials and the stored manufacturer credentials correspond to a manufacturer of the remote field device and of an application executing on the mobile device, and wherein the stored owner credentials correspond to an entity that subscribes to a service provided by the manufacturer to operate the remote field device.

8. A mobile device, comprising:

one or more memories configured to, individually or in combination, store instructions; and one or more processors communicatively coupled with the one or more memories, wherein the one or more processors are, individually or in combination, configured to execute the instructions to cause the mobile device to:

detect a signal broadcasted by a remote field device, wherein the signal includes a unique identifier of the remote field device;

transmit, to the remote field device and based on the unique identifier, a connection request including credentials related to performing a manufacturer control function on the remote field device; and based on a response to the connection request from the remote field device, establish a connection with the remote field device to allow initiating, by the mobile device, the manufacturer control function on the remote field device, wherein the connection with the remote field device is established via an encrypted secure channel that logically isolated from a second encrypted secure channel that the remote field device establishes with another mobile device authorized for accessing other functions of the remote field device, such that the connection established via stored manufacturer credentials can access the manufacturer control function and cannot access the other functions.

9. The mobile device of claim 8, wherein the manufacturer control function comprises transmitting, to the remote field device and over the connection, an updated firmware package.

10. The mobile device of claim 8, wherein the connection request is transmitted using one of a Bluetooth or near field communication (NFC) technology.

11. The mobile device of claim 8, wherein an application that transmits the connection request stores, in the one or more memories, the credentials related to performing the manufacturer control function on the remote field device, and stores, in the one or more memories, owner credentials for accessing additional functions of a second remote field device.

12. The mobile device of claim 11, wherein the establishing the connection includes establishing, with the remote field device, the encrypted secure channel on a subnetwork that is different from another encrypted secure channel on another subnetwork that the mobile device establishes with the second remote field device for accessing the additional functions of the second remote field device.

13. The mobile device of claim 11, wherein the credentials correspond to a manufacturer of the remote field device and of the application, and wherein the owner credentials correspond to an entity that subscribes to a service provided by the manufacturer to operate the second remote field device.

14. A method for performing manufacturer control functions on a remote field device, comprising:

receiving, from a mobile device, a connection request including credentials related to performing a manufacturer control function on the remote field device;

verifying the credentials with stored manufacturer credentials that are stored in one or more memories for performing the manufacturer control function, wherein the stored manufacturer credentials are different from stored owner credentials stored in the one or more memories for accessing other functions of the remote field device; and based on verifying the credentials, establishing a connection with the mobile device to allow initiating, by the mobile device, the manufacturer control function on the remote field device, wherein the connection with the mobile device is established via an encrypted secure channel that logically isolated from a second encrypted secure channel that the remote field device establishes with another mobile device authorized for accessing the other functions of the remote field device, such that the connection established via stored manufacturer credentials can access the manufacturer control function and cannot access the other functions.

15. The method of claim 14, further comprising broadcasting a unique identifier of the remote field device, wherein receiving the connection request is in response to the broadcasting of the unique identifier.

16. The method of claim 14, wherein the manufacturer control function comprises:

receiving, from the mobile device and over the connection, an updated firmware package; and executing the updated firmware package to update firmware of the remote field device.

17. The method of claim 14, wherein the connection request is received using one of a Bluetooth or near field communication (NFC) technology.

18. The method of claim 14, wherein verifying the credentials is based on determining that the credentials received from the mobile device are not verified with the stored owner credentials.

19. The method of claim 14, wherein establishing the connection includes establishing, with the mobile device, the encrypted secure channel on a subnetwork that is different from the second encrypted secure channel on a second subnetwork that the remote field device establishes with the another mobile device.

20. The method of claim 14, wherein the credentials and the stored manufacturer credentials correspond to a manufacturer of the remote field device and of an application executing on the mobile device, and wherein the stored owner credentials correspond to an entity that subscribes to a service provided by the manufacturer to operate the remote field device.

* * * * *